US010039291B2

(12) United States Patent
Koizumi et al.

(10) Patent No.: US 10,039,291 B2
(45) Date of Patent: Aug. 7, 2018

(54) METHOD FOR MANUFACTURING FROZEN COOKED NOODLES

(71) Applicant: NISSHIN FOODS INC., Chiyoda-ku (JP)

(72) Inventors: Norio Koizumi, Fujimino (JP); Takenori Watanabe, Fujimino (JP); Youichirou Miya, Fujimino (JP)

(73) Assignee: NISSHIN FOODS INC., Chiyoda-ku (JP)

( * ) Notice: Subject to any disclaimer, the term of this patent is extended or adjusted under 35 U.S.C. 154(b) by 0 days.

(21) Appl. No.: 14/890,505

(22) PCT Filed: Jun. 20, 2014

(86) PCT No.: PCT/JP2014/066388
§ 371 (c)(1),
(2) Date: Nov. 11, 2015

(87) PCT Pub. No.: WO2014/203991
PCT Pub. Date: Dec. 24, 2014

(65) Prior Publication Data
US 2016/0106126 A1   Apr. 21, 2016

(30) Foreign Application Priority Data
Jun. 21, 2013 (JP) ................................ 2013-130354

(51) Int. Cl.
A23L 7/109 (2016.01)
A21D 2/26 (2006.01)
A23P 30/20 (2016.01)

(52) U.S. Cl.
CPC ............ A21D 2/265 (2013.01); A21D 2/264 (2013.01); A23L 7/111 (2016.08); A23P 30/20 (2016.08); A23V 2002/00 (2013.01)

(58) Field of Classification Search
CPC . A23L 3/36; A23L 3/361; A23L 3/362; A23L 3/363; A23L 3/364; A23L 3/365; A23L 1/16; A23L 1/1613; A23L 1/162; A23L 3655/00; A23L 3655/10; A23L 137/10; A23L 137/109; A23L 137/11; A23L 137/111; A23L 137/113; A23L 137/115; A21D 2/00; A21D 2/08; A21D 2/26; A21D 2/264; A21D 2/265; A21D 2/266; A21D 15/00; A21D 15/02; A23V 2002/00; A23P 30/20
See application file for complete search history.

(56) References Cited

U.S. PATENT DOCUMENTS 4,540,590 A * 9/1985 Harada .................... A23L 7/111 426/324
4,965,082 A * 10/1990 Chawan ................ A23L 1/1613 426/331
6,187,357 B1 * 2/2001 Meyer ...................... A23L 7/111 426/502
2002/0150660 A1 * 10/2002 Pasch .................... A23L 1/1613 426/335
2004/0081738 A1 * 4/2004 Murty ..................... A21D 2/36 426/557
2005/0196507 A1 * 9/2005 Gimelli ................... A23L 7/109 426/557
2010/0055283 A1 * 3/2010 Nakamura ............. A21D 13/04 426/555
2011/0142999 A1 * 6/2011 Wind ..................... A21D 10/04 426/238

FOREIGN PATENT DOCUMENTS

| EP | 2 984 937 | 2/1916 |
|---|---|---|
| EP | 2 796 057 | 10/2014 |
| JP | 61 141855 | 6/1986 |
| JP | 62 143661 | 6/1987 |
| JP | 4 252148 | 9/1992 |
| JP | 4-293466 | 10/1992 |
| JP | 9 70272 | 3/1997 |
| JP | 10 42811 | 2/1998 |
| JP | 11 266811 | 10/1999 |
| JP | 20011037434 | 2/2001 |
| JP | 2001 245617 | 9/2001 |
| JP | 2001 346533 | 12/2001 |
| JP | 2002/101835 | 4/2002 |
| JP | 2002 199852 | 7/2002 |
| JP | 2002-199852 | 7/2002 |

(Continued)

OTHER PUBLICATIONS

Vita Spelt NPL, published Sep. 27, 2011, http://web.archive.org/web/20110927053748/http://www.natureslegacyforlife.com/faqs/what-is-spelt/.*
Spelt Ramen NPL, published Jan. 17, 2013, http://www.mummyicancook.com/2013/01/how-to-make-asian-egg-alkaline-noodles.html.*
International Search Report dated Sep. 16, 2014 in PCT/JP2014/066388 filed Jun. 20, 2014.
Written Opinion of the International Searching Authority dated Sep. 16, 2014 in PCT/JP2014/066388 filed Jun. 20, 2014.
Extended European Search Report as received in the corresponding European Patent Application No. 14813790.4 dated Dec. 5, 2016.
Search Report and Written Opinion issued in the corresponding Singapore Patent Application No. 11201509922V dated Oct. 19, 2016.

Primary Examiner — Erik Kashnikow
Assistant Examiner — Bryan Kim
(74) Attorney, Agent, or Firm — Oblon, McClelland, Maier & Neustadt, L.L.P.

(57) ABSTRACT

Provided is frozen cooked noodles which can be stored in a frozen state for a long time and present satisfactory appearance and texture after defrosting. A method for manufacturing frozen cooked noodles comprising obtaining raw noodles by extruding dough containing from 0.5 to 5 parts by mass of a plant protein and 100 parts by mass of wheat flour containing 70 mass % or more of a regular wheat flour at a pressure of from 60 kgf/cm² to 160 kgf/cm², cooking the raw noodles, and freezing the cooked noodles.

11 Claims, No Drawings

(56) References Cited

FOREIGN PATENT DOCUMENTS

| | | |
|---|---|---|
| JP | 2004 229570 | 8/2004 |
| JP | 2008 295338 | 12/2008 |
| JP | 20091284893 | 12/2009 |
| JP | 2011 62116 | 3/2011 |
| JP | 2011 67163 | 4/2011 |
| JP | 2012 157320 | 8/2012 |
| WO | 2012/157544 | 11/2012 |
| WO | 2013/094724 | 6/2013 |
| WO | 2013 157309 | 10/2013 |
| WO | 2013 171930 | 11/2013 |
| WO | 2013 191136 | 12/2013 |
| WO | 2014 024539 | 2/2014 |
| WO | 2014/157035 | 10/2014 |

\* cited by examiner

METHOD FOR MANUFACTURING FROZEN COOKED NOODLES

TECHNICAL FIELD

The present invention relates to a method for manufacturing frozen cooked noodles. The invention more particularly relates to a method for manufacturing frozen cooked noodles, which can be stored in the cooked state under refrigeration for a long time.

BACKGROUND ART

Recently, with the development of freezing technique, frozen noodles, which are prepared by freezing cooked noodles which can have been cooked so as to be edible such as udon or Chinese noodles, have been distributed and commercially available. Such frozen noodles have an advantage in that they can be stored for a long time. Furthermore, frozen cooked noodles, sauce and toppings are packaged in a single package and sold as easy-to-cook frozen foods in the market. However, some cooked noodles become soggy; with the result that the noodles may lose elasticity and have soft texture, and present matte and dull-color appearance. In addition, some noodles stored in a freezer become white, lose smoothness and become firm but brittle and nonelastic in texture; in other words, so-called freezer burn may occur.

A high-pressure extrusion noodle production method where noodle dough is extruded at a high pressure is conventionally known as a process for making Italian pastas such as spaghetti and macaroni (sometimes referred to simply as pasta in the specification). The high-pressure extrusion noodle production method has been generally used for producing dry pasta. More specifically, dry pasta is produced by extruding pasta dough at a high pressure, followed by drying. Patent Literatures 1 to 3 describe production of frozen pasta by boiling raw noodle strands or semidry noodle strands, which are obtained by extrusion molding of pasta dough, followed by freezing. Since pasta is generally produced mainly from hard wheat flour such as durum-semolina and durum wheat flour, the pasta has a characteristic texture, i.e., relatively chewy and firm and crispy texture. Pasta produced by high-pressure extrusion, such as dry pasta further apparently has such a characteristic.

In contrast, noodles such as udon or Chinese noodles are preferred to have appropriate viscosity and elasticity. In order to provide such a texture, in some cases when producing udon or Chinese noodles in the art, ingredients such as wheat flour are strictly selected to make the quality (hard, soft) of starch appropriate, the content of the protein of the flour ingredient is controlled, or additives such as kansui, gluten, starch, egg, albumen powder, salt and gums are used to increase viscosity and elasticity of dough.

For example, Patent Literature 4 describes a method for making frozen noodles by freezing pregelatinized noodles made from wheat flour containing at least 12 wt % of a crude protein, etherified or acetylated tapioca starch and gluten. Patent Literature 5 describes a method for making raw noodles by extruding a mixture of wheat flour, vital gluten and/or egg white and water under reduced pressure. Patent Literature 6 describes a method for making Chinese noodles by adding kansui to a mixture of wheat flour, starch, vital powdery gluten and egg white, kneading the mixture, and then extruding the resultant noodle sheet in a deaeration condition at a low pressure of about 30 kg/cm$^2$ or less and further rolling the sheet to mold into noodle strands. Patent Literature 7 describes a method for making Chinese-style noodles by adding kansui to a powder mixture of durum-semolina and starch, kneading the mixture, followed by subjecting the kneaded mixture to extrusion molding.

CITATION LIST

Patent Literature

[Patent Literature 1] JP-A-S61-141855
[Patent Literature 2] JP-A-H9-70272
[Patent Literature 3] JP-A-2001-346533
[Patent Literature 4] JP-A-H10-042811
[Patent Literature 5] JP-A-2001-245617
[Patent Literature 6] JP-A-H04-252148
[Patent Literature 7] JP-A-S62-143661

SUMMARY OF INVENTION

Technical Problem

An object of the present invention is to provide frozen cooked noodles which can be stored in a frozen state for a long time, and have satisfactory appearance and texture, i.e., viscosity and elasticity, that are similar to those provided by eating raw noodles such as raw udon or Chinese noodles immediately after cooking, right after defrosting the frozen cooked noodles or even after the passage of time from the defrosting.

Solution to Problem

Conventionally, noodles such as udon or Chinese noodles, which are required to have appropriate viscosity and elasticity, have been generally produced by rolling dough prepared from e.g., moderate wheat flour or semi-hard wheat flour by using e.g., a roller to obtain a noodle sheet having a predetermined thickness, and then cutting the noodle sheet by using a cutting blade into noodle strands. It has been considered that production of these noodles through extrusion molding by applying a high pressure is not preferable, because satisfactory texture such as viscosity and elasticity may be damaged.

However, as a result of various studies, the present inventors surprisingly found that, frozen cooked noodles, which are obtained by extruding noodle dough, which is prepared by blending wheat flour and a plant protein in predetermined amounts, at a high pressure to make noodles, followed by cooking and freezing, can be stored in a frozen state for a long time and present satisfactory appearance and texture that are similar to those provided by eating raw noodles such as raw udon or Chinese noodles immediately after coking, right after defrosting the frozen cooked noodles and even after the passage of time after the defrosting.

More specifically, the present invention provides a method for manufacturing frozen cooked noodles comprising extruding dough, which is obtained by blending from 0.5 to 5 parts by mass of a plant protein and 100 parts by mass of wheat flour containing 70 mass % or more of a common wheat flour, at a pressure of from 60 kgf/cm$^2$ to 160 kgf/cm$^2$ to obtain raw noodles, cooking the raw noodles and freezing the cooked noodles.

Advantageous Effects of Invention

The frozen cooked noodles obtained by the manufacturing method of the present invention, can present satisfactory appearance, i.e., smooth surface and no discoloration, and preferable texture, i.e., viscosity and elasticity, that are similar to those obtained as if conventional raw noodles such as raw udon or Chinese noodles are eaten immediately upon cooking, after defrosting the frozen cooked noodles and even after storing in a frozen state for a long time. Furthermore, the frozen cooked noodles obtained by the manufacturing method of the present invention, even if the noodles are stored together with a sauce in a frozen state, can be prevented from degrading their quality caused by impregnation of the noodles with the sauce while stored.

DESCRIPTION OF EMBODIMENTS

The noodles provided as the frozen cooked noodles of the present invention may be foods obtained by molding dough prepared by kneading raw material flour containing cereal flour as a main material; however, generally do not preferably include noodles mainly containing durum-semolina or a durum wheat flour, for example, Italian pastas including long pastas such as spaghetti, short pastas such as macaroni and flat pastas such as lasagna. Preferable examples of the noodles provided by the present invention include noodle strands such as udon, hiyamugi, somen, kishimen, soba, Okinawa soba and Chinese noodles, short noodles such as dumpling and dough wrapper such as jiao-zi (Chinese dumpling wrapper).

In the specification, raw noodles refer to noodles produced from noodle dough and thereafter cooked to obtain an edible state without subjecting the noodles to a drying step or surface-pregelatinization step, and should be distinguished from dry noodles, semidry noodles and half-cooked noodles such as noodles the surface of which is treated with steam and half-boiled noodles.

In the method for manufacturing frozen cooked noodles of the present invention, raw noodles are prepared by applying extremely high pressure to noodle dough compared to that applied in a conventional process for making udon or Chinese noodles. For example, in the manufacturing method of the present invention, dough may be extruded at a pressure of from 60 kgf/cm$^2$ to 160 kgf/cm$^2$ to make noodles. The extrusion pressure used in the method of the present invention is similar to the extrusion pressure (about from 70 to 160 kgf/cm$^2$) usually used in producing dry pastas and is extremely high compared to the pressure applied to noodle dough during a conventional process for making raw noodles such as raw udon or Chinese noodles.

The dough for raw noodles prepared in the manufacturing method of the present invention, is obtained by adding water for kneading (kneading water) to a flour ingredient, which is prepared by blending wheat flour as a main material and a predetermined amount of plant protein, and kneading the mixture. The wheat flour contained in the flour ingredient is wheat flour generally used as an ingredient for the foregoing noodles such as udon or Chinese noodles that are provided by the present invention. Examples thereof include flours of common wheats (hexaploid wheats) such as hard wheat flour, semi-hard wheat flour, moderate wheat flour and soft wheat flour. These common wheat flours may be used singly or in combination of two or more of them. At least one of semi-hard wheat flour and moderate wheat flour is preferably contained, and moderate wheat flour is more preferable.

The above flour ingredients may include wheat flours other than the above common wheat flours, such as durum wheat flour and durum-semolina generally used in producing Italian pastas. However, noodles containing a large amount of durum wheat flour and durum-semolina are firm in texture. For the reason, it is desirable that the content of durum wheat flour and durum-semolina in the flour ingredient are low, and preferably less than 30 mass %, more preferably less than 20 mass % and further preferably less than 10 mass % relative to the total amount of wheat flour in the flour ingredient. Note that durum wheat flour and durum-semolina are preferably not included in the flour ingredient. Or, the content of the above common wheat flour in the wheat flour contained in the flour ingredient is preferably 70 mass % or more, more preferably 80 mass % or more, further preferably 90 mass % or more and still preferably 100 mass %.

The plant protein to be incorporated into the above flour ingredient includes wheat protein, corn protein, gluten, gliadin, zein and kafirin. Of these, gluten is preferable. The content of the plant protein in the flour ingredient is from 0.5 to 5 parts by mass, preferably from 1 to 4 parts by mass and more preferably from 1 to 3 parts by mass relative to 100 parts by mass of the wheat flour in the flour ingredient. If the content of the plant protein is less than 0.5 parts by mass, the viscosity and elasticity of noodles may deteriorate. Thus, the content of less than 0.5 parts by mass is not preferable. In contrast, if the content of the plant protein exceeds 5 parts by mass, noodles get firm. Thus, the content exceeding 5 parts by mass is not preferable.

To the above flour ingredient, in addition to the above wheat flour and plant protein, may be blended additional ingredients usually used in making noodles such as udon or Chinese noodles, for example, starch, modified starch, saccharides, egg, albumen powder, salt, kansui, fat and oil, an emulsifier and a thickener. The content of the additional ingredients in the flour ingredient may be from 0 to 30 parts by mass relative to the 100 parts by mass of wheat flour in the flour ingredient.

For the kneading water used in making dough for the raw noodles, water or a liquid usually used for making noodles, such as water, salt water or an aqueous kansui solution can be used. The amount of kneading water added, in consideration that a high extrusion pressure as mentioned above is to be applied to the resultant dough, is preferably from 20 to 43 parts by mass, more preferably from 23 to 40 parts by mass, further preferably from 26 to 37 parts by mass and still preferably from 29 to 34 parts by mass relative to 100 parts by mass of the above flour ingredient. If the amount of kneading water added is less than 20 parts by mass, the noodles extruded may become brittle. In contrast, if the amount of kneading water added exceeds 43 parts by mass, the dough is weak and likely to be damaged. In either case, the obtained noodles may not have desired appearance or texture.

In the manufacturing method of the present invention, raw noodles are obtained by extruding the noodle dough obtained in the aforementioned procedure at a high pressure. More specifically, in the manufacturing method of the present invention, the dough may be extruded at a pressure of, for example, from 60 kgf/cm$^2$ to 160 kgf/cm$^2$, preferably from 80 to 140 kgf/cm$^2$, to prepare raw noodles. The degree of vacuum used in making noodles by extrusion may be from −200 mmHg to vacuum and preferably from −600 mmHg to vacuum. In making noodles, dough can be extruded by using e.g., an extrusion noodle-making machine for use in making dry pastas. In a process for preparing raw noodles according to the present invention, it is sufficient that the aforementioned flour ingredient and kneading water are kneaded and the resultant dough is extruded to make noodles. Thus, it is sufficient to perform a single kneading step and a single noodle making step. According to the present invention, in the manufacturing process, it is not necessary to knead the dough made into noodles again or subject the dough made into noodles to the noodle making step again. In other words, it is not necessary to carry out the kneading step and the noodle making step twice or more.

The shape of raw noodles prepared in the present invention is not particularly limited. Noodles may be extruded into a desired shape by setting, for example, a die having holes of an appropriate shape at the noodle strand-extruding portion of an extrusion noodle-making machine in common use and extruding dough through the die.

Subsequently, the obtained raw noodles are directly cooked without subjecting the noodles to a drying step, surface-pregelatinization step and the like to thereby obtain an edible state. The cooking method is not limited as long as raw noodles are pregelatinized to obtain an edible state; for example, steam cooking, boil cooking or a combination of them is mentioned. Of them, steam cooking is preferable. In either case, noodles are preferably cooked such that the yield of cooked noodles (the mass ratio of noodles cooked to raw noodles) becomes about from 200 to 260 mass %. For example, in the boil cooking, raw noodles may be boiled in water at a temperature ranging from 70° C. to the boiling point for from 2 to 10 minutes. In the steam cooking, raw noodles may be steamed for from 5 to 15 minutes by using a steamer. The noodles cooked, if necessary, are drained and/or cooled, and then subjected to a freezing treatment.

For the freezing treatment in the manufacturing method of the present invention, a freezing treatment usually applied to noodles may be employed. For example, it is preferable that the noodles cooked as mentioned above be, if necessary, divided into portions having a predetermined amount, for example, 150 to 300 g (corresponding to the amount per person), placed on e.g., a tray, and then subjected to a freezing treatment. Quick freezing or slow freezing may be employed for the freezing treatment; however, quick freezing is preferable. After noodles are once frozen by quick freezing, the frozen noodles may be stored in the frozen storage conditions routinely employed.

In the freezing treatment mentioned above, cooked noodles may be frozen together with seasonings such as soup and sauce and toppings. For example, the noodles cooked as mentioned above may be served into containers, to which e.g., sauce, soup and toppings are added, and then frozen. Alternatively, sauce, toppings and the like may be mixed with the cooked noodles, then placed in containers and frozen. The sauce used here can be any type as long as it can be used as a soup or sauce for noodles. Examples thereof may include, but not limited to, ramen (Chinese noodles) soup, udon soup, soba soup, sauce for chow mein, thick sauce, Worcester sauce, curry sauce, cream sauce, oil sauce, salt sauce, soy sauce and miso sauce.

In the manufacturing method of the present invention, the cooked noodles may be further cooked before subjecting to the freezing treatment. For further cooking, the noodles may be heated preferably by use of e.g., a hot griddle or a hot frying pan, favorably together with fat and oil. More specifically, baking, sautéing, frying and shallow frying are mentioned as examples. The further cooking provides the noodles with sautéed flavor due to sautéing and surface shrinkage, making the texture more elastic. In the further cooking, the noodles may be cooked together with sauce as mentioned above. If the noodles are cooked with sauce, the noodles may be further provided with flavor of sauce.

The frozen cooked noodles made by the manufacturing method of the present invention, are improved in freeze tolerance compared to conventional frozen noodles prepared by boiling raw noodles such as raw udon or raw Chinese noodles followed by freezing. Even if the frozen cooked noodles of the invention are stored in a frozen state for a long time, the appearance and texture of the noodles are satisfactorily maintained. Therefore, the frozen cooked noodles of the present invention can present, even after defrosting or reheating, satisfactory appearance such as smooth surface and no discoloration and preferable texture such as viscosity and elasticity that are similar to those obtained when raw noodles such as raw udon or Chinese noodles are eaten immediately upon boiling. Furthermore, in the frozen cooked noodles made by the manufacturing method of the present invention, deterioration of noodles in texture and appearance caused by absorption of soup and sauce can be prevented. Because of this, even if the noodles are stored together with soup, sauce and the like in a frozen state for a long time, the quality of the noodles can be satisfactorily maintained.

EXAMPLES

Now, the present invention will be more specifically described by way of Examples; however, the present invention is not limited to these Examples alone.

Production Examples 1 to 8

To moderate wheat flour (Number one: Nisshin Seifun) (100 parts by mass), gluten (Super-gle 85H: Nippon-Colloid), an aqueous kansui solution and water were added in the amounts shown in Table 1. The mixture was stirred by using a mixer under reduced pressure and kneaded to prepare noodle dough. The dough was extruded at a pressure shown in Table 1 by using a noodle-making machine under a reduced pressure of −600 mmHg to obtain raw Chinese noodles (having a circular sectional shape of 2 mm in diameter).

Each of raw noodles thus obtained was cooked (for about 7 minutes) in a steamer set at an inner temperature of about 101° C. so as to obtain a yield of 220 mass %. The cooked noodles were roughly cooled, divided into portions of 100 g for each, quickly frozen at −25° C. or less, and then individually packed in a food packaging bag to obtain frozen cooked Chinese noodles.

Production Example 9

Noodle dough was obtained in the same manner as in Production Example 1. The noodle dough was rolled by using a roller in accordance with a customary method, and then cut by using a cutting blade to obtain raw Chinese noodles (having a circular sectional shape of 2 mm in diameter). The raw noodles thus obtained were cooked in a steamer, frozen and packaged in the same manner as in Production Example 1 to obtain frozen cooked Chinese noodles.

Test Example 1

Each of the frozen cooked Chinese noodles of Production Examples 1 to 9 was stored at −18° C. for a week, and thereafter defrosted by heating in a microwave oven (600 W, 4 minutes). Immediately upon defrosting, appearance and texture of the noodles were evaluated. Furthermore, the noodles defrosted were wrapped and allowed to leave at room temperature (25° C.) for 6 hours and then, appearance and texture were evaluated. Evaluation was made by 10 panelists in accordance with the evaluation criteria shown in Table 2. Evaluation scores were averaged. The results are shown in Table 1.

TABLE 1

| | Production Example 1 | Production Example 2 | Production Example 3 | Production Example 4 | Production Example 5 | Production Example 6 | Production Example 7 | Production Example 8 | Production Example 9 |
|---|---|---|---|---|---|---|---|---|---|
| Wheat flour (parts by mass) | 100 | 100 | 100 | 100 | 100 | 100 | 100 | 100 | 100 |
| Gluten (parts by mass) | 3 | 3 | 3 | 3 | 3 | 3 | 3 | 3 | 3 |
| kansui solution (parts by mass) | 0.7 | 0.7 | 0.7 | 0.7 | 0.7 | 0.7 | 0.7 | 0.7 | 0.7 |
| Water (parts by mass) | 34 | 34 | 34 | 34 | 34 | 34 | 34 | 34 | 34 |
| Extrusion pressure (kgf/cm$^2$) | 40 | 60 | 80 | 100 | 120 | 140 | 160 | 180 | — |
| Texture | | | | | | | | | |
| (immediately after defrosting) | 2.6 | 3.5 | 4.2 | 4.4 | 4.6 | 3.9 | 3.4 | 3.0 | 2.1 |
| (6 hours after defrosting) | 2.1 | 3.3 | 4.1 | 4.2 | 4.5 | 3.6 | 3.3 | 2.8 | 1.2 |
| Appearance | | | | | | | | | |
| (immediately after defrosting) | 3.1 | 3.5 | 4.3 | 4.5 | 4.5 | 4.3 | 4.2 | 4.1 | 2.3 |
| (6 hours after defrosting) | 2.5 | 3.3 | 4.0 | 4.2 | 4.4 | 4.2 | 4.1 | 4.0 | 2.1 |

TABLE 2

| Texture of noodle (immediately & 6 hours after defrosting) | 5 | Extremely satisfactory texture with appropriate viscous firmness and sufficient elasticity |
|---|---|---|
| | 4 | Satisfactory texture with viscous firmness and elasticity |
| | 3 | Slightly firmer texture |
| | 2 | Unsatisfactory texture with being too firm or slightly too soft |
| | 1 | Extremely unsatisfactory texture with being extremely too soft |
| Appearance of noodles (immediately & 6 hours after defrosting) | 5 | Extremely satisfactory appearance with being very smooth, totally dullness-free color |
| | 4 | Satisfactory appearance with being smooth and dullness-free color |
| | 3 | Slightly smooth and slightly dull-color appearance |
| | 2 | Unsatisfactory appearance with less smoothness and dull color |
| | 1 | Extremely unsatisfactory appearance with extremely less smoothness and significantly dull color |

Production Examples 10 to 17

Raw Chinese noodles were made and cooked in a steamer in the same manner as in Production Examples 1 to 8. The cooked Chinese noodles were once cooled and then sautéed together with chopped carrot, cabbage, pork and sauce to produce chow mein. The chow mein thus produced was roughly cooled and divided into portions of 100 g (noodle weight) each, quickly frozen at −25° C. or less and thereafter individually placed in food packaging bag to obtain frozen cooked chow mein.

Production Example 18

Raw Chinese noodles were made in accordance with the same formulation and process as in Production Example 9 and cooked in a steamer. Chow mein was produced from cooked Chinese noodles thus obtained, in the same manner as in Production Example 10, frozen and packaged to obtain frozen cooked chow mein.

Test Example 2

Each of the frozen cooked chow mein products of Production Examples 10 to 18 was evaluated in the same manner as in Test Example 1 except for in accordance with the evaluation criteria shown in Table 4, with respect to appearance and texture immediately after defrosting by heating in a microwave oven and 6 hours after the defrosting. The results are shown in Table 3.

TABLE 3

| | Production Example 10 | Production Example 11 | Production Example 12 | Production Example 13 | Production Example 14 | Production Example 15 | Production Example 16 | Production Example 17 | Production Example 18 |
|---|---|---|---|---|---|---|---|---|---|
| Wheat flour (parts by mass) | 100 | 100 | 100 | 100 | 100 | 100 | 100 | 100 | 100 |
| Gluten (parts by mass) | 3 | 3 | 3 | 3 | 3 | 3 | 3 | 3 | 3 |
| Lye water (parts by mass) | 0.7 | 0.7 | 0.7 | 0.7 | 0.7 | 0.7 | 0.7 | 0.7 | 0.7 |
| Water (parts by mass) | 34 | 34 | 34 | 34 | 34 | 34 | 34 | 34 | 34 |
| Extrusion pressure (kgf/cm$^2$) | 40 | 60 | 80 | 100 | 120 | 140 | 160 | 180 | — |

TABLE 3-continued

|  | Production Example 10 | Production Example 11 | Production Example 12 | Production Example 13 | Production Example 14 | Production Example 15 | Production Example 16 | Production Example 17 | Production Example 18 |
|---|---|---|---|---|---|---|---|---|---|
| Texture |  |  |  |  |  |  |  |  |  |
| (immediately after defrosting) | 2.8 | 3.6 | 4.3 | 4.6 | 4.9 | 3.9 | 3.5 | 3.0 | 2.2 |
| (6 hours after defrosting) | 2.1 | 3.3 | 4.1 | 4.3 | 4.8 | 3.5 | 3.3 | 2.9 | 1.2 |
| Appearance |  |  |  |  |  |  |  |  |  |
| (immediately after defrosting) | 3.2 | 3.5 | 4.3 | 4.5 | 4.4 | 4.3 | 4.2 | 4.3 | 2.5 |
| (6 hours after defrosting) | 2.8 | 3.4 | 4.2 | 4.4 | 4.4 | 4.2 | 4.1 | 4.0 | 2.4 |

TABLE 4

| | | |
|---|---|---|
| Texture of chow mein (immediately & 6 hours after defrosting) | 5 | Extremely satisfactory texture with appropriate viscous firmness and sufficient elasticity, sufficiently sautéed flavor and extremely good taste |
| | 4 | Satisfactory texture with viscous firmness and elasticity, sautéed flavor and good taste |
| | 3 | Slightly firmer and slightly sticky texture |
| | 2 | Unsatisfactory texture with being too firm or slightly too soft and sticky |
| | 1 | Extremely unsatisfactory texture with being extremely too soft, and very sticky |
| Appearance of chow mein (immediately & 6 hours after defrosting) | 5 | Extremely satisfactory appearance with being very smooth, totally dullness-free color |
| | 4 | Satisfactory appearance with being satisfactorily smooth and dullness-free color |
| | 3 | Slightly smooth and slightly dull-color appearance |
| | 2 | Unsatisfactory appearance with less smoothness and dull color |
| | 1 | Extremely unsatisfactory apperance with extremely less smoothness and significantly dull color |

Production Examples 19 to 23

Frozen cooked chow mein was made in the same manner as in Production Example 14 except that the yield of raw Chinese noodles cooked in a steamer was changed as shown in Table 5.

Test Example 3

Each of the frozen cooked chow mein products of Production Examples 19 to 23 was evaluated in the same manner as in Test Example 2. The results are shown in Table 5. Note that the results of Production Example 14 are listed again in Table 5.

TABLE 5

|  | Production Example 19 | Production Example 20 | Production Example 14 | Production Example 21 | Production Example 22 | Production Example 23 |
|---|---|---|---|---|---|---|
| Wheat flour (parts by mass) | 100 | 100 | 100 | 100 | 100 | 100 |
| Gluten (parts by mass) | 3 | 3 | 3 | 3 | 3 | 3 |
| kansui solution (parts by mass) | 0.7 | 0.7 | 0.7 | 0.7 | 0.7 | 0.7 |
| Water (parts by mass) | 34 | 34 | 34 | 34 | 34 | 34 |
| Extrusion pressure (kgf/cm$^2$) | 120 | 120 | 120 | 120 | 120 | 120 |
| Yield (mass %) | 190 | 200 | 220 | 240 | 260 | 290 |
| Texture |  |  |  |  |  |  |
| (immediately after defrosting) | 3.3 | 4.2 | 4.9 | 4.2 | 3.8 | 2.8 |
| (6 hours after defrosting) | 3.1 | 3.9 | 4.8 | 3.9 | 3.5 | 2.2 |
| Appearance |  |  |  |  |  |  |
| (immediately after defrosting) | 3.8 | 4.4 | 4.4 | 4.0 | 4.1 | 3.9 |
| (6 hours after defrosting) | 3.7 | 4.1 | 4.4 | 3.9 | 4.1 | 3.8 |

Production Examples 24 to 28

Frozen cooked chow mein was made in the same manner as in Production Example 14 except that the amount of gluten added to noodle dough was changed as shown in Table 6.

Test Example 3

Each of the frozen cooked chow mein products of Production Examples 24 to 28 was evaluated in the same manner as in Experimental Example 2. The results are shown in Table 6. Note that the results of Production Example 14 are listed again in Table 6.

TABLE 6

|  | Production Example 24 | Production Example 25 | Production Example 26 | Production Example 14 | Production Example 27 | Production Example 28 |
| --- | --- | --- | --- | --- | --- | --- |
| Moderate wheat flour (parts by mass) | 100 | 100 | 100 | 100 | 100 | 100 |
| Gluten (parts by mass) | 0.1 | 0.5 | 1 | 3 | 5 | 6 |
| kansui solution (parts by mass) | 0.7 | 0.7 | 0.7 | 0.7 | 0.7 | 0.7 |
| Water (parts by mass) | 34 | 34 | 34 | 34 | 34 | 34 |
| Extrusion pressure (kgf/cm$^2$) | 120 | 120 | 120 | 120 | 120 | 120 |
| Yield (mass %) | 220 | 220 | 220 | 220 | 220 | 220 |
| Texture |  |  |  |  |  |  |
| (immediately after defrosting) | 3.5 | 4.6 | 4.7 | 4.9 | 4.4 | 3.4 |
| (6 hours after defrosting) | 3.2 | 4.4 | 4.6 | 4.8 | 4.3 | 3.3 |
| Appearance |  |  |  |  |  |  |
| (immediately after defrosting) | 3.5 | 4.4 | 4.5 | 4.4 | 4.3 | 4.2 |
| (6 hours after defrosting) | 3.4 | 4.3 | 4.4 | 4.4 | 4.2 | 4.1 |

The invention claimed is:

1. A method for manufacturing frozen cooked Chinese noodles, the method comprising:
   obtaining raw noodles by extruding dough comprising from 0.5 to 5 parts by mass of a plant protein relative to 100 parts by mass of wheat flour and 100 parts by mass of wheat flour comprising 70 mass % or more of hexaploid wheat flour at a pressure of from 60 kgf/cm$^2$ to 160 kgf/cm$^2$;
   cooking the raw noodles to form cooked Chinese noodles; and
   freezing the cooked Chinese noodles.

2. The method according to claim 1, wherein the plant protein is gluten.

3. The method according to claim 1, wherein the dough is obtained by kneading 100 parts by mass of a flour ingredient and 20 to 43 parts by mass of kneading water.

4. The method according to claim 1, wherein a yield of the cooked Chinese noodles is from 200 to 260 mass %.

5. The method according to claim 1, wherein the freezing of the cooked Chinese noodles comprises freezing the cooked Chinese noodles together with a soup or a sauce.

6. The method according to claim 1, further comprising, before freezing the cooked Chinese noodles, cooking the cooked Chinese noodles together with a sauce.

7. The method according to claim 1, wherein the dough further comprises one or more additional wheat flours.

8. The method according to claim 1, wherein the dough further comprises durum wheat flour, durum-semolina flour, or a combination thereof.

9. The method according to claim 8, wherein the durum wheat flour, the durum-semolina flour, or the combination thereof is present in the dough in an amount of less than 30 mass % relative to the total amount of wheat flour.

10. The method according to claim 8, wherein the durum wheat flour, the durum-semolina flour, or the combination thereof is present in the dough in an amount of less than 10 mass % relative to the total amount of wheat flour.

11. The method according to claim 1, wherein the dough comprises from 1 to 3 parts by mass of the plant protein.

* * * * *